July 23, 1935. H. B. HARTMAN 2,009,230
METHOD OF AND APPARATUS FOR PURIFYING WATER
Filed Jan. 16, 1931 2 Sheets-Sheet 2
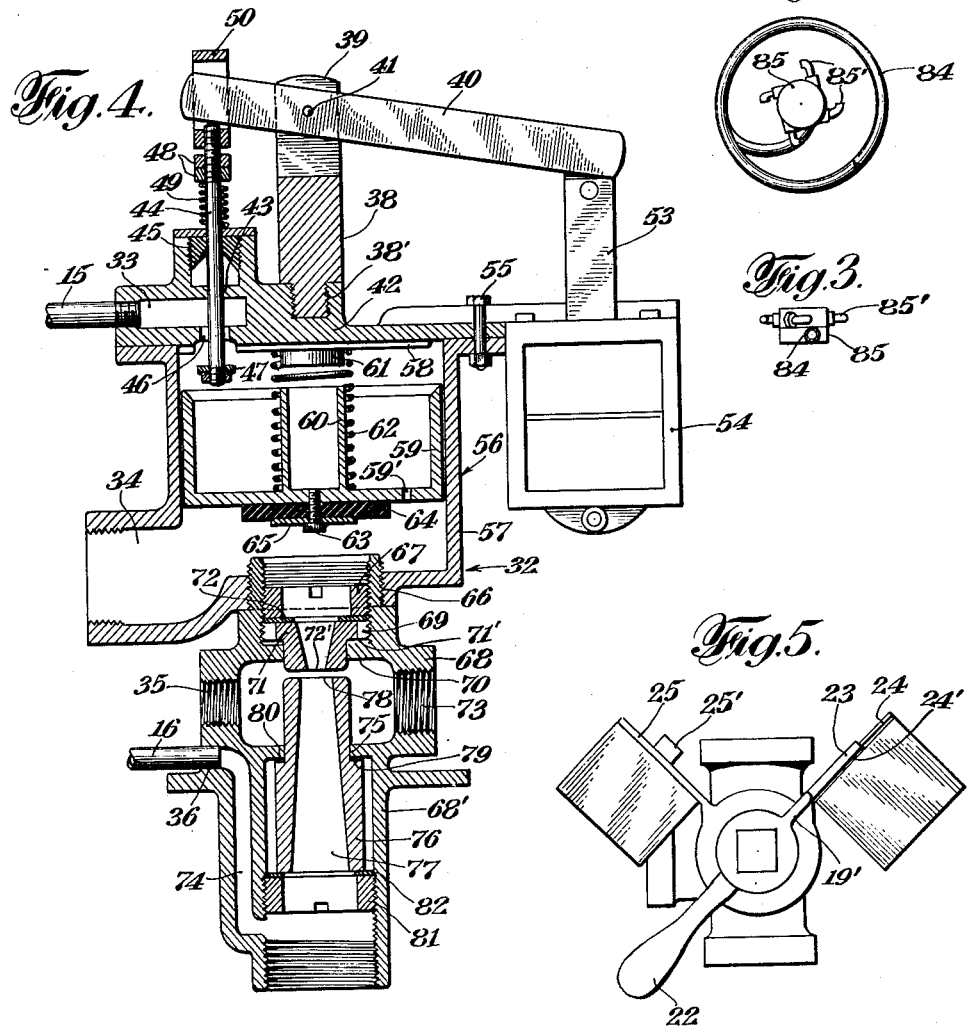
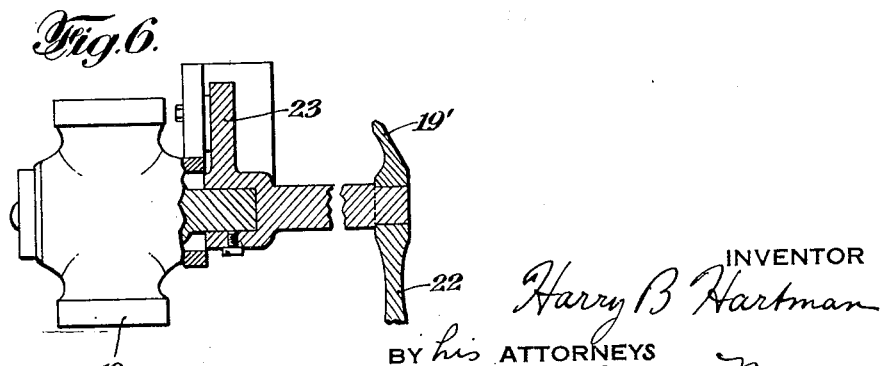
INVENTOR
Harry B Hartman
BY his ATTORNEYS
Prindle, Bean & Mann Patented July 23, 1935

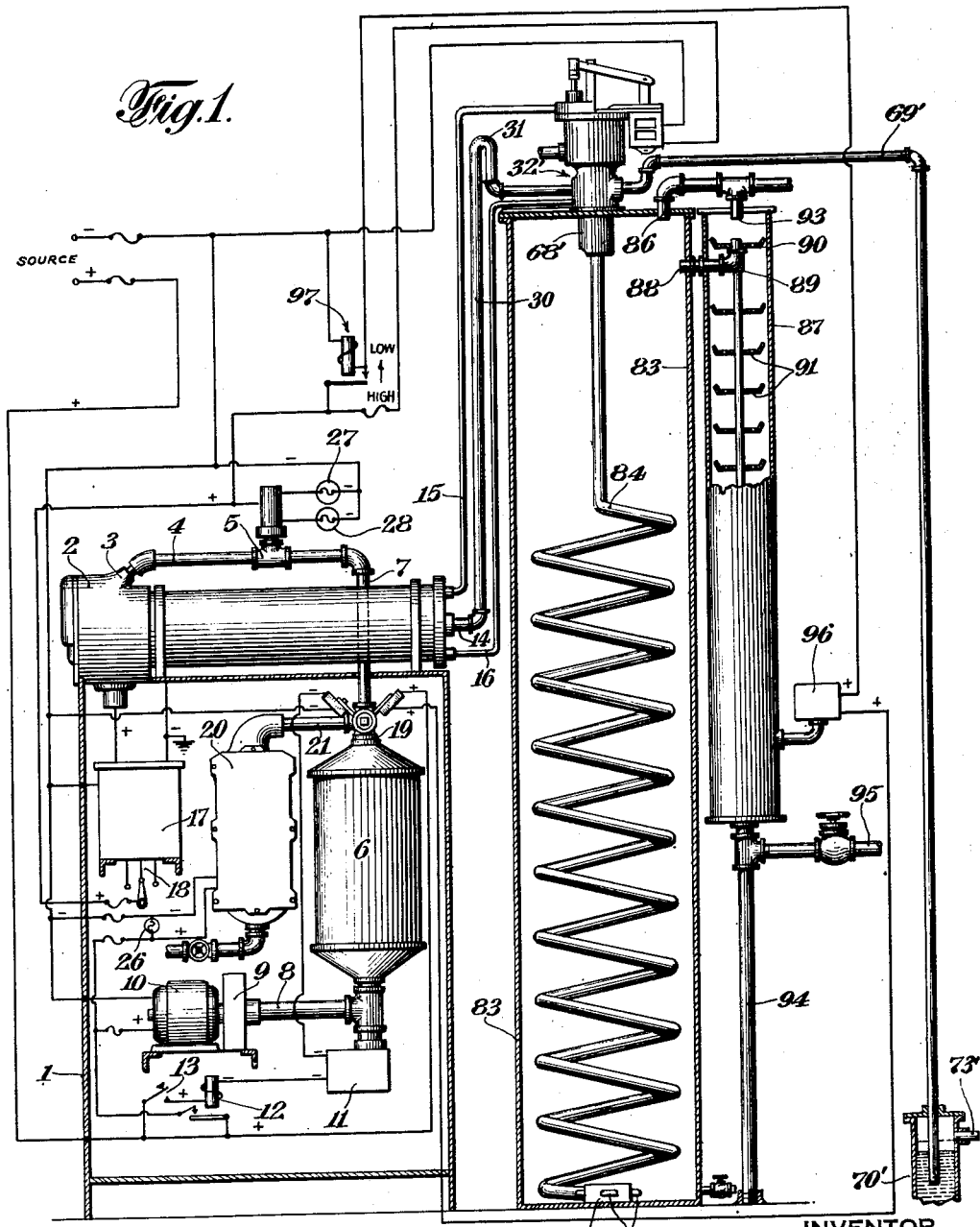

2,009,230

UNITED STATES PATENT OFFICE 2,009,230

METHOD OF AND APPARATUS FOR PURIFYING WATER

Harry Buxton Hartman, Buffalo, N. Y.

Application January 16, 1931, Serial No. 509,061

8 Claims. (Cl. 210—27)

This invention relates to an ozone water sterilizer that has few moving parts, and has a maximum of efficiency for water purification.

One object of the invention is the provision of an apparatus and method for purifying water by ozonization, and thereafter removing all traces of ozone from the treated water.

Another object of the invention is the provision of an apparatus which subjects water to ozonization, and which cools the generator by by-passing a portion of the water which is to be treated around the generator.

A further object of this invention is the provision of an apparatus and a method for purifying water in which ozone is automatically generated as needed, and the generator is automatically cooled only while it is being used.

A further object of the invention is the provision of a water seal and an overflow mechanism, whereby the generator is protected from a back flow of water.

Another object is the provision of an apparatus and a method for purifying water in which the water to be treated is passed through a nozzle member, and ozone is drawn in and mixed with the falling stream of water.

For the accomplishment of the foregoing, and such other objects as may hereinafter appear, this invention consists in the method of and apparatus for purifying water hereinafter specified.

While, for the purpose of illustrating my invention, both as to the method and apparatus aspects thereof, I have chosen the best embodiment thereof known to me, my invention is capable of embodiment as to both of said aspects in many different forms, and my invention is, therefore, not to be limited to the said illustrative embodiment and it is expressly to be understood that various changes can be made both in the said method, and in the said apparatus within the scope of the claims and without digressing from my inventive idea.

In the drawings—

Figure 1 represents a front elevation of one embodiment of the invention with parts shown in section to facilitate the disclosure, the electrical connections also being included.

Figure 2 represents a top plan view of the bottom of the mixing column.

Figure 3 is a front elevation of the bottom of the coil in said mixing column showing the distributing head and the jets.

Figure 4 represents a vertical transverse sectional view taken through the magnetic control valve, and shows the water inlet turned 90° so as to be in the same plane as the other openings in this figure.

Figure 5 is a front elevation of the three-way valve and two-way switch; and

Figure 6 represents a side elevation of the valve and switch with parts shown in section to facilitate the disclosure.

Referring now to the drawings, a casing 1 is provided which is adapted to receive a dehydrator, a heater, a transformer, and an air pump. An ozone generator 2 is mounted on the top of the casing 1 and will be first described since the devices within the casing 1 are ancillary thereto. Ozone is generated from the air and this particular generator is cooled by water so as to increase the yield of ozone, the water to be used also being used to cool the generator. The particular generator shown in Figure 1 is the subject-matter of a separate application filed by me on even date herewith. However, the invention is not restricted to this particular generator, and other ozone generators may be used. The generator is provided with an air inlet 3 which is connected by a pipe 4 to a vacuum switch 5, and a dehydrator 6 by means of piping 7. The dehydrator 6 is provided with a pipe 8 which is connected to a fan 9, the fan being driven by an electric motor 10. When the device is operating to reactivate the dehydrating material in the dehydrator, the fan 9 draws air through the dehydrator 6, which may be filled with silica gel or any other suitable dehydrating material, the air leaving the dehydrator being conducted to the generator 2. A thermostatic switch 11 is provided near the bottom of dehydrator 6 so that at the end of the reactivation or regeneration of the dehydrating agent, the hot air actuates the switch 11 and the current to the motor 10 and heater 20 is turned off by opening the circuit. In order to prevent the said circuit from closing when cooled off, a relay 12 is provided that maintains the circuit open after the said switch has opened, and it is necessary to close a spring switch 13 when another reactivation is to be made.

In the ozone generator 2, the dehydrated air is passed to an inner electrode which tends to cool the same, and then passes to the polar space between the inner and outer electrodes where it is subjected to a silent brush discharge which is the result of imposing a high voltage on one of the electrodes. The mixture containing ozone is conducted from the generator 2 by a pipe 14. The generator 2 is provided with an inlet pipe 15 and an outlet pipe 16 which conduct cooling water to a water jacket surrounding the outer electrode so as to maintain the same in a cooled condition. Connected to the electrodes is a transformer 17 provided with a three-way switch 18, which permits the use of different voltages for different purposes.

The top of the dehydrator 6 is provided with a three-way valve 19, which is shown in Figures 1, 5 and 6, the side opening leading to a heater 20 by means of pipe 21. This three-way valve 19 is provided with a lever having a handle 22 and an arm 23 for operating switches 24 and 25 by depressing switch plungers 24' or 25' respectively which plungers operate the said switches. The switches are provided with springs (not shown) by which, when pressure on the plunger thereof is released, the spring will restore the switch to its initial position. When the dehydrating material in the dehydrator has become substantially inoperative and full of moisture so that it fails to dehydrate the air, the lever 22 is fastened to the rotatable valve member so that said member is turned when the lever is swung to operate one of the said switch plungers. The parts are so positioned that when the dehydrating material in the dehydrator has become full of moisture and is inoperative so that it fails to dehydrate the air, the said rotatable member of the three-way valve is rotated so as to shut off the air going into the generator 2 and to permit air to be drawn through heater 20 and through dehydrator by fan 9 in the opposite direction, to dry and reactivate the dehydrating material in the dehydrator 6.

When the contact member 23 has depressed the switch plunger 24' on switch box 24, the generator 2, transformer 17, vacuum switch 5, and other switches later to be described, are in the circuit, and ozone is being generated as needed and water is being treated with the generated ozone. When the three-way valve and two-way switch mechanism is rotated in the other direction, the contact member 23 is also rotated to depress the plunger 25' on the switch box 25, and the current to the generator and transformer is shut off, while the current to the motor 10 for the fan or blower 9, and the heater is turned on, so that the air is drawn through the dehydrator. When this circuit is on, a white light 26 in the same circuit is lit to indicate that the dehydrator is being reactivated.

The vacuum switch 5 for the generator is provided with a red light 27 and a green light 28. When the pressure of air in the pipe falls, the red light 27 will burn, whereas, when the device is functioning properly the green light 28 will burn. It will, therefore, be apparent that visible indicators are provided to show the condition of the device. The lamps 26, 27 and 28, the two-way switch 19' and the spring switch 13 for convenient manipulation and ready access and view are placed or mounted on the casing 1.

The air mixture containing ozone is led from the generator by the pipe 14 connected to a pipe 30 which is provided with an inverted U-shaped member 31 at its top, one end of the U-shaped member being connected to the injector and nozzle member 32, shown in detail in Figure 4. The member 31 prevents the entry of water into the generator. The water pipes 15 and 16 are connected to the injector and nozzle member 32. The injector and nozzle member 32 is provided with an opening 33 to receive the water pipe 15, a larger opening 34 for receiving water from a source of supply, a smaller opening 35 which is adapted to receive the shorter end of the U-shaped member 31, and a smaller opening 36 adapted to receive water from the pipe 16. A member 38 is threaded into opening 38' in the top of the casing and is provided with a slot 39 in its upper portion which is adapted to receive a lever 40 mounted on a pivot 41. A top plate member 42 of the injector and nozzle member 32 is provided with a vertical opening 43 which is adapted to receive a vertical rod 44 and that communicates with the opening 33. Surrounding the rod 44 is a packing gland, generally designated by the numeral 45. The rod 44 also extends through the opening 33 and through an enlarged opening 46 which is adapted to permit the passage of water between the rod 44 and the top plate member 42. The end of the rod 44 is provided with a valve member 47 which is adapted to fit against the bottom of the top plate member and close the opening 46 therein. The upper end of rod 44 has a threaded end which is provided with the nut members 48. Mounted on the rod 44 between the top of the packing gland or bearing member 45 and the nut members 48 is a spring 49 which is adapted to urge the valve member 47 to closing position. At its upper end the rod 44 is provided with a slotted, threaded member 50 which is adapted to receive one end of the lever 40.

The other end of lever 40 rests on a rod 53 which is operated by an electrosolenoid 54, the frame of which is connected to the top plate member 42 by means of a bolt 55. The top plate member 42 is secured to the injector and nozzle member 32, preferably so as to be easily removable to permit access to the interior of the chamber 56, which is positioned beneath and formed by the sleeve member 57 which is provided with the opening 34 above referred to. The bottom of top plate member 42 is provided with a centering ring 58. This chamber 56 is in communication with opening 33 in top plate member 42 by means of the opening 46. A piston 59 is slidably mounted in said chamber and is open at its top, and is provided with a small opening 59' which permits equalization of the pressure on opposite sides of the piston when it is desired to allow the piston to descend. A sleeve 60 extends upwardly from the interior of said piston substantially centrally thereof. The top plate member 42 is provided with a central depending lug 61 in alinement with said sleeve 60. A spring 62 is mounted on the said sleeve and said lug and is adapted to bear against the bottom of the top plate member 42 at its one end and the inner top surface of piston 59 at its other end. Secured to the middle of the bottom surface of piston 59 by the screw 63 is a reinforced rubber washer 64 and a metal ring 65 forming a valve member adapted to co-operate with a valve seat to be presently described.

The bottom of chamber 56 is provided with a threaded opening adapted to receive a threaded sleeve 66 which co-operates with washer 64 to permit or prevent the flow of water therethrough. A smaller, slotted, sleeve 67 is threaded into sleeve 66 and is adapted to threadedly receive the injector mechanism to be now described. The hollow member 68 is provided in its top with a threaded opening 69, having the flange 70. Mounted in this opening and on flange 70, is a flanged nozzle member 71 resting on washer 72. This member 71 is made of lava to resist the action of ozone and is provided with an opening which tapers down to the small opening 72'. The sleeve 67 above referred to threadedly engages sleeve 66 and threaded opening 69 on the hollow member 68 so as to hold the parts in assembled relation.

The hollow member 68 is provided with the opening 35 above referred to and the opening 73 which functions as a water overflow connected to a water seal to prevent water from passing to the generator 2 through opening 35 if the water accumulated in member 68. The overflow opening 73 communicates with a pipe 69' which leads to the trap or water seal 70' prevents water from running out of opening 35 which leads to the generator. When the device is shut off suddenly or the valve is leaky, there would be an accumulation of water and the overflow mechanism takes care of this. The pipe 69' extends beneath the surface of the water in seal 70' so as to allow the escape of water from the injector when the machine shuts off to prevent water backing into the generator, and at the same time the down pipe is submerged in a water seal to prevent the injector from sucking air through this pipe instead of from the generator when the machine is operating. The water seal 70' is provided with the opening 73' to permit the running out of the liquid which collects in the water seal. The hollow member 68 is also provided with the opening 36 above referred to which communicates with passageway 74 that leads to a point below the injector and nozzle member.

In alinement with opening 69 is an opening 75 adapted to receive the bottom nozzle member 76 which cooperates with nozzle member 71. The nozzle member 76 is provided with a tapered opening 77 which is smallest at the top, as at 78, adjacent said opening 72 in the top nozzle member. However, the opening 78 is larger than opening 72'. Intermediate its ends the nozzle member 76 is provided with an annular exterior shoulder 79 upon which is mounted a washer 80. The bottom interior portion of member 68 is tubular, as designated by 68', and is provided with threads so as to receive the slotted, threaded sleeve 81. Mounted on sleeve 81 is a washer 82. This sleeve is adapted to abut the bottom of nozzle member 76 so as to hold it in position and force the shoulder 79 against the flange on opening 75.

The injector and nozzle member just described is mounted on a mixing chamber 83, the said chamber being adapted to bring about intimate contact between the ozone and the water to be treated. Connected to the bottom 68' of the sleeve member 68 is a long, helical coil 84 which is adapted to conduct the ozonized water to the bottom of the chamber 83. A long helical coil is provided to permit prolonged and intimate contact between the ozone and the water, the helical form providing a smooth, long curved path so as to avoid all sharp and abrupt turns or bends which have a tendency to throw the ozone out of solution. The coil 84 rests on the bottom of chamber 83 and is provided with a distributing head 85. Extending from this head are the curved outlet pipes or jets 85' which give the ozonized water a whirling motion and so tend to agitate it to mix the ozone therewith. The ozone and gases which are not dissolved in the water rise to the top of mixing chamber 83 and are conducted therefrom by the pipe 86. The ozone is objectionable in the water which leaves the machine because it will oxidize the iron piping of the building and will spoil the flavor of the bottled product. In order to remove residual ozone, the water is further treated by breaking the water up into minute droplets. This is accomplished by a deozonizing chamber 87 which is connected to the top portion of the mixing chamber 83 by a pipe 88. For the purpose of more completely removing the ozone from the treated water etc., the pipe 88 has an upwardly directed elbow 89 in said deozonizing chamber which delivers the ozonized water to a top, dished, apertured plate 90 mounted thereon. The plate 90 is provided with openings 91 which permit the water to drop to the next plate 90 which is similar to the upper plate 90, but is positioned beneath said plate. The water in dropping is broken up into droplets and the residual ozone is removed. A plurality of such plates 90 are provided, the plates being mounted on a pipe member 92 substantially centrally of the deozonizing chamber 87. The top of said deozonizing chamber is provided with a pipe 93 which communicates with pipe 86 connected to the top of mixing chamber 83, and is adapted to carry away the ozone and other gases. The chamber 87 is supported by a pipe 94 which communicates with the bottom of chamber 87. The treated water is taken from the pipe 94 by the valved pipe 95.

Positioned adjacent the bottom of the chamber 87 is a pressure switch 96 which is responsive to pressure resulting from different levels in said chamber. When the liquid level falls below a certain point, the switch closes a circuit and operates a relay 97 which operates the electromagnet in casing 54 on the injector or nozzle member to allow more water to flow through the device.

As the control of the entire apparatus is connected with the column 87, complete operation will now be described beginning with the column 87 as being empty. With the device empty the deozonizing column 87 is empty and switch 96 is, therefore, closed and current is conducted to electrosolenoid 54. The two-way switch is in position so that contact member 23 contacts plate 24. When the electromagnet is energized, arm 53 moves upwardly and moves lever 40 which at its other end presses down on rod 44 to open the opening 46. This permits water from the source of supply to enter opening 34 and force piston 59 upwardly and water is forced through the nozzle and injector member. In passing through nozzles 71 and 76 a suction is created adjacent the ozone opening 35 and ozone is mixed with the water. By this suction or reduction of pressure, air is drawn through pipe 8, dehydrator 6, pipe 7 and generator 2 where it is subjected to a silent brush discharge to generate ozone. This ozone and air then pass up through pipe 30 to ozone inlet 35.

When the circuit is closed by pressure switch 96, the transformer 17 is in the circuit and therefore begins to operate.

When valve 46 is opened the water is forced through opening 33 to cool the generator and is conducted from the generator by pipe 16 to passage-way 74 and joins the stream of water below the injector and nozzle member. It will be seen that the generator is operated and cooled only when it is necessary to produce ozone. This is important, because it is efficient and economical.

After the ozone is thus introduced into the water, the water for thorough treatment with the ozone is conducted to a mixing chamber 83 by the long, helical coil 84 having a distributing head in the bottom of the mixing chamber or tank, the said head being provided with a plurality of jets which give the water a swirling or whirling motion to agitate it. The gas and ozone escape from the top of the tank. When the level of water in tank 83 reaches the pipe 88, the water is conducted to a deozonating chamber 87. There the water is dropped from one apertured plate to another to pulverize the stream and remove the residual ozone. The ozone and air pass out through opening 93. The water is taken as needed from the valved pipe 95. When the level in tank 87 reaches a certain height, the pressure switch 96 is open and the circuit is therefore open. No current is led to the generator 2 and generation of ozone stops. Spring 49 closes valve member 47 and by means of the opening 59' in the piston 59, the pressure on opposite sides of the piston 59 is equalized and the spring 62 seats the piston to close valve opening in sleeve 66. The valve member 47 also closes off the cooling water to the generator 2. The water which has collected in the injector and nozzle member flows through overflow opening 73 and to the water sealing means 70'. This water sealing means also prevents the entry of moist air to the generator.

The pressure on the mixture of ozone and water in the nozzle mixer in the coil 84 and in the mixing chamber 83, increases the purifying action of the ozone on the water and materially adds to the efficiency of my apparatus.

When the dehydrator has been running for some time it needs to be reactivated or regenerated. To do this lever 23 is rotated so that it depresses the plunger 25' on switch 25. This cuts the current from the transformer and places the heater 20, and motor 10 in a circuit so that hot air is drawn through the heater, through valve 19, through dehydrator 6 and out through fan 9. It is to be noted that the two-way switch is also connected to the three-way valve so that the air conduits are also changed by the valve 19. When the dehydrating material has become thoroughly dehydrated, the temperature of the heated air passing out through pipe 8, rises and operates the thermostatic switch 11 and the circuit is opened. In order to prevent the switch 11 from closing when it is cool, a relay 12 is used to lock the circuit open and when it is desired to start the operation again the spring switch 13 is actuated manually. A light is put in the motor circuit to show when the dehydrator is being operated. Of course, when the reactivating operation is finished, the circuit is open and the light will be out.

From the foregoing description it will be apparent that I have produced a very effective method of and apparatus for ozonizing water, the apparatus being substantially automatic in its operation, having a minimum of moving parts and may be built in various sizes at a minimum cost.

What I claim is:

1. The method of purifying water, which comprises, mixing ozone and water, generating ozone as it is required for the water to be treated, cooling the generator with a portion of the water to be treated only when the generator is operating, and returning such portion of the cooling water to the body of water to be treated.

2. A valve member, provided with an opening for a supply of water, a piston in said valve member for closing said opening, a second piston in said valve member, electromagnetic means adapted to be actuated to move said second piston whereby said first mentioned piston is adapted to uncover said opening to permit the flow of water through said opening, a nozzle and injector member through which water is adapted to flow to mix ozone therewith, said nozzle and injector member being provided with an opening for receiving ozone.

3. A dehydrator adapted to be connected with an ozone generator or a heater, including, a three-way valve adapted to be turned to place either the generator or the heater into communication with said dehydrator, said three-way valve being provided with two switches, one of which is adapted to place the generator in a circuit and the other of which is adapted to place the heater in another circuit.

4. In an apparatus of the character described, an ozone generator, an injector and nozzle member, a valve member in communication with said injector and nozzle member and being provided with a water inlet and a water outlet, piston means in said valve member for opening and closing the water outlet, said injector and nozzle member being provided with an ozone inlet to permit the entry of ozone, and electrical means for stopping the operation of said generator, and for permitting the closing of said piston means when a predetermined amount of ozonized water has accumulated.

5. A continuous method of treating water, which comprises, mixing freshly produced ozonized gas with water, conducting such mixture of water and ozonized gas through an extended confined space and in a helical path, then passing such mixture into and through a mixing tank, and then pulverizing the treated water to remove residual ozone.

6. A device of the character described for purifying water, including, in combination, an ozone generator, a source of water to be treated, means for by-passing some of the water to cool the generator, a mixing chamber, an injector and nozzle member connected with said ozone generator and said source of water, said injector and nozzle member discharging into said mixing chamber, and means associated with said injector and nozzle member for preventing water from entering said ozone generator.

7. A device of the character described for purifying water, including, in combination, an ozone generator, a source of water to be treated, means for by-passing some of the water to cool the generator, a mixing chamber, an injector and nozzle member connected with said ozone generator and said source of water, said injector and nozzle member discharging into said mixing chamber, and means associated with said injector and nozzle member for preventing water from entering said ozone generator, said means including an overflow pipe.

8. A device of the character described, including, an ozone generator, a source of water to be treated, an injector and nozzle member associated with said generator and said source of water supply for mixing an ozonized gas and water, a mixing chamber for receiving the mixture from said injector and nozzle member, means for by-passing some of the water to be treated to cool said ozone generator, said by-pass means returning the water below the injector and nozzle member.

HARRY BUXTON HARTMAN.